United States Patent [19] Evans et al.

[11] 3,800,098

[45] Mar. 26, 1974

[54] KEY TELEPHONE SYSTEM TRANSFER ARRANGEMENT

[75] Inventors: John Grover Evans, Bradley Beach; Charles Ernest Morse, Holmdel, both of N.J.

[73] Assignee: Bell Telephone Laboratories, Incorporated, Murray Hill, N.J.

[22] Filed: June 12, 1972

[21] Appl. No.: 262,013

[52] U.S. Cl. .................................. 179/99, 179/18 B

[51] Int. Cl. .............................................. H04m 3/42

[58] Field of Search 179/99, 27 CA, 18 BD, 18 BC, 179/18 BE

[56] References Cited

UNITED STATES PATENTS

| | | | |
|---|---|---|---|
| 3,571,520 | 3/1971 | Clarke | 179/99 |
| 3,544,727 | 12/1970 | Sturtevant et al. | 179/18 BC |
| 3,449,527 | 7/1969 | Strobelt et al. | 179/18 BD |
| 2,975,237 | 3/1961 | Abbott et al. | 179/99 |
| 3,173,995 | 3/1965 | Abbott et al. | 179/27 CA |

*Primary Examiner*—William C. Cooper
*Attorney, Agent, or Firm*—D. H. Tannenbaum

[57] ABSTRACT

In situations where a large number of lines terminate at a key telephone station such as occurs when the station is used for call director purposes, it is often necessary to transfer a call incoming on one line to some other line terminating at that station. A scanning circuit is arranged to operate in response to a signal from the station to detect and mark the line currently connected to that station. When the currently active line is marked, the pickup key associated with an idle line is operated and a connection is established to a called station. The original incomng marked line is then bridged to the selected line and the station may be removed from the connection.

23 Claims, 15 Drawing Figures

KEY TELEPHONE SYSTEM TRANSFER ARRANGEMENT

BACKGROUND OF THE INVENTION

As the demand for business communication key telephone systems increases, the uses for which such systems are employed also increases and become more sophisticated. For example, in the copending application of C. E. Morse, Ser. No. 258,106, filed May 30, 1972, there is shown a key telephone system adapted to perform a call distributing and call queueing function. In certain situations it is desirable to establish a transfer connection from one incoming line under the control of an attendant at a key station to another line.

The provision of call transfer service is relatively easy when there is s single station having one or two lines thereat. In the simplest form, a switch may be closed to complete a connection to a bridge between the two lines. Even in the case of three, or maybe even four such lines, simple switch arrangements could be devised in a relatively straightforward manner to establish the desired transfer connections.

However, in situations where a large number of incoming lines are connectable to a number of key telephone stations and where transfer connections involving any two of these lines are to be effected, the required switching circuitry becomes complex. One problem which must be overcome is the identification of the lines which are to be connected to the transfer bridge. Compounding the problem is the ever-present desire to make the switching circuitry as automatic as possible so that extensive attendant training is not required.

Thus it would be highly desirable to arrange a call transfer system so that any line can be connected to any other line at a key telephone system attendant's console merely by operating a single key at that console. The prior art does not now have such an arrangement for bridging together any selected two lines of a multiline key telephone system.

Another problem that exists with respect to key telephone systems is that when all of the stations are busy a next incoming call must wait before it is answered. In certain situations this waiting time can become excessive and highly undesirable. It would be highly advantageous then if, when all of the consoles of a key telephone system are busy, all incoming calls are routed through the system to a distant point.

Such operation would be particularly advantageous in situations where the key telephone system customer has a number of key telephone systems in different parts of the country with attendants at each key station of each such system. Since, under such a condition, the probable calling demand would be different in every time zone, a more even handling of calling connections could be realized. At present such call forwarding arrangements are only performed by complex switching equipment either as part of the central office switching machine or as part of large call distributing systems. No arrangement presently exists for routing an incoming call to a key telephone system and through that system to a selected distant point.

Accordingly, one object of our invention is to provide an arrangement for selecting and marking a line connected to an attendant's console for transfer purposes and for selecting another line for connection to the first line in a straightforward and easy manner.

A still further object of our invention is to provide a circuit for use in a key telephone system which functions such that when all of the attendant consoles are busy, the next incoming call can be routed in an overflow manner through the system to a selected trunk.

SUMMARY OF THE INVENTION

A key telephone system is arranged so that each console is provided with a call transfer key. In response to the operation of the key at any console, the line currently communicating with the console is marked by a voltage potential. An auxiliary line circuit operates in reponse to the voltage on the associated line and causes a selector to hunt for the marked line. When the selector arrives at the marked line, a connection is established between the communicating leads of that line and the input of a transfer bridge.

The attendant at the console then selects a line to be bridged to the first line and operates the pickup key associated with the selected line. The control circuitry again functions to mark the line associated with the second operated pickup key. Another selector is then enabled which scans each line in turn, hunting for the now marked line. When the second selector finds the marked line, the communication leads associated with that line are connected to the output of the transfer bridge. At that point a bridge connection is established between the called and calling subscriber and the attendant may remain on the connection or may serve other calling connections. Supervision of the connection is retained by the calling and called subscribers.

When an incoming connection arrives during a period when all of the attendant stations are busy or not manned, the incoming line is marked and the selector operates to bridge that line with a particular outgoing trunk. Upon completion of such a bridged connection, ringing is supplied forward over the outgoing trunk to the called station and the connection is effectively switched through the key system to the distant point.

Accordingly, it is one feature of our invention to provide circuitry for marking calling and called lines so that an attendant at a key telephone console can establish a connection from any marked line currently communicating with the console to the input of a transfer bfidge and can establish a connection from any selected marked other line to the output of the transfer bridge and can thereafter give complete supervisory control to the lines connected to the transfer bridge.

It is another feature of our invention to arrange a key telephone system such that when a call is incoming to the system during any period when all of the key stations are busy, the particular line on which the call is directed is detected and connected to a particular outgoing trunk circuit associated with some distant point.

DESCRIPTION OF THE DRAWING

The foregoing objects, features and advantages, as well as others of the invention, will be more apparent from the following description of the drawing, in which.

It will be noted that FIG. 2 through 14 employ a type of notation referred to as "detached contact" in which an "X" shown intersecting a conductor represents a normally open contact of a relay and a bar shown intersecting a conductor at right angles represents a normally closed contact of a relay; "normally" referring to the unoperated condition of the relay. The principles of this type of notation are described in an article entitled "An Improved Detached Contact Type Schematic Circuit Drawing" by F. T. Meyer in the September 1955 publication of the American Institute of the Electrical Engineers Transactions, Communications and Electronics, Vol. 74, pages 505–513.

Figure 2:
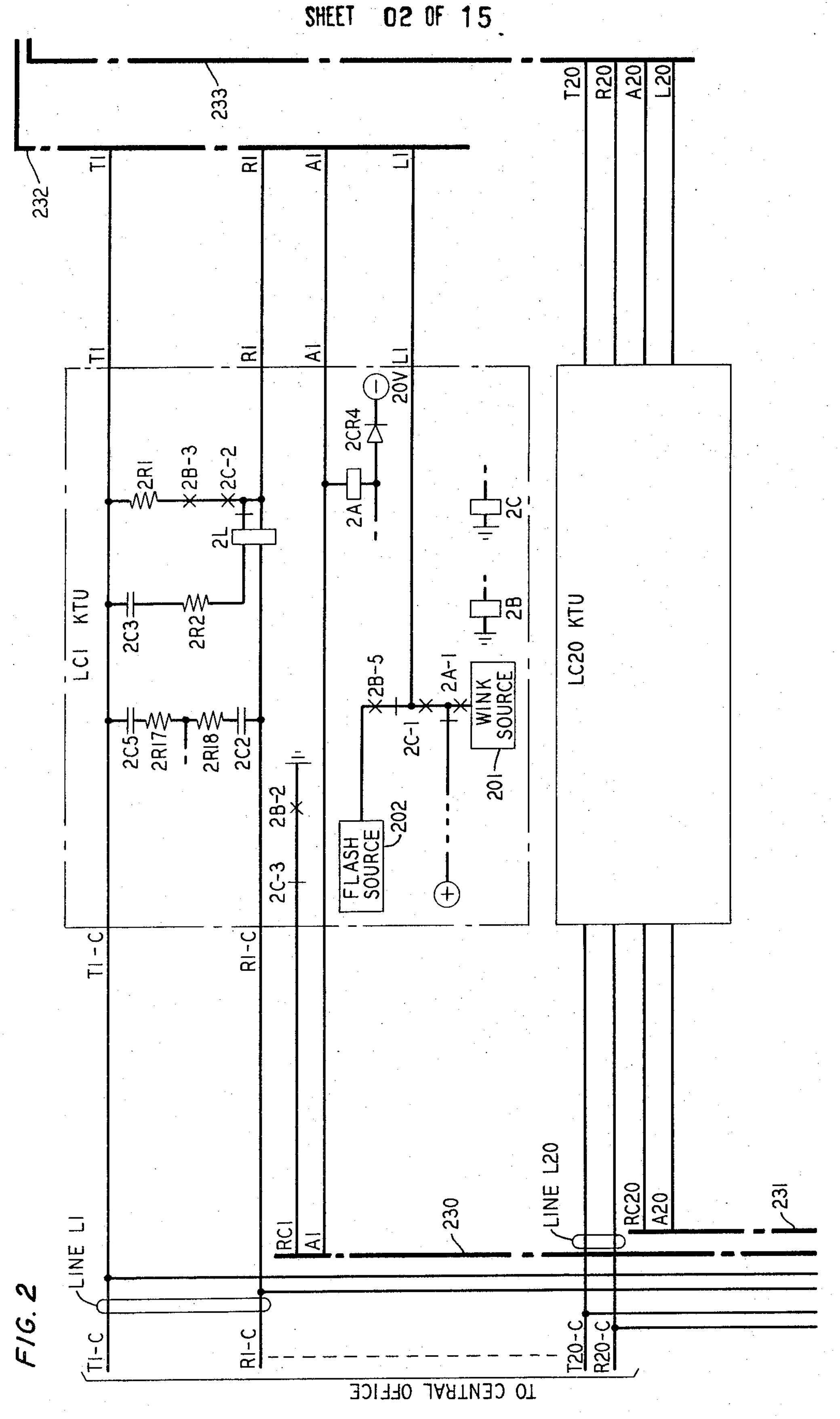
FIG. 2 through 14 are schematic drawings showing in greater detail the interrelation of the components of the exemplary embodiment.

It will be noted also that in order to simplify the disclosure and thus facilitate a more complete understanding of the embodiment, the relays, relay contacts and other electromechanical devices shown in FIG. 2 through 14 have been given systematic designations. Thus, the number preceding the letters of each device correspond to the figure in which the control circuit of the device is show. Thus, the coil of relay 2A is shown in FIG. 2. Eacy relay contact, either make, break or transfer, is shown with its specific contact number preceded by the designation of the relay to which it belongs. For example, the notation 2A-1 indicates contact number 1 of relay 2A the coil of which is shown in FIG. 2.

In order to further facilitate an understanding of the invention, the description of the operation of the exemplary embodiment has been subdivided into a general description portion designated 1.0 and a detailed description portion designated 2.0. Section 1.0 and its subsections describe the invention in general terms with respect to FIG. 1. Section 2.0 and its subsections describe the invention in detail with respect to FIG. 2 through 14.

1.0 General Description

Figure 1:
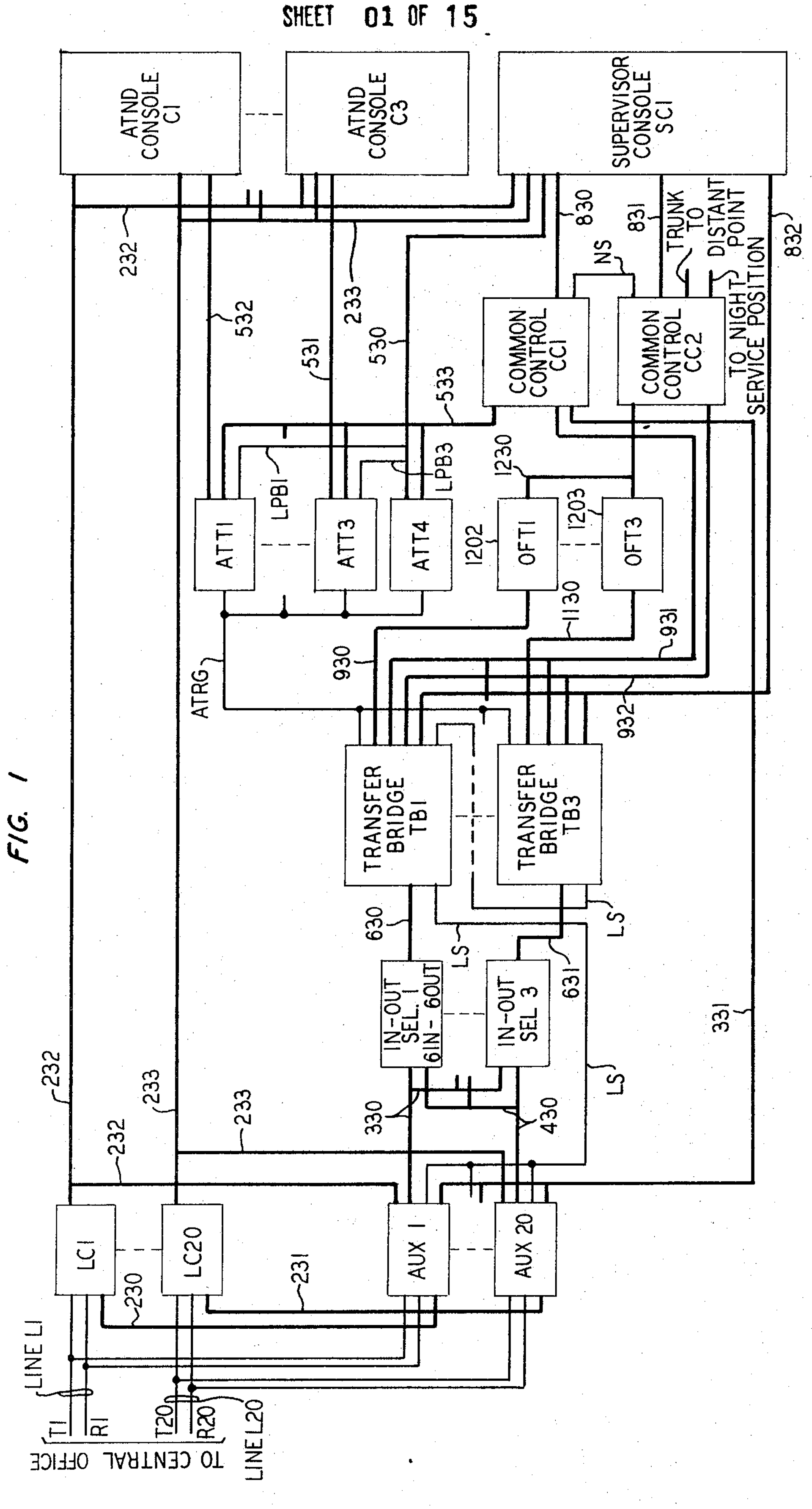
FIG. 1 is essentially a block diagram showing the interrelation of the exemplary embodiment of the invention.

Referring now to FIG 1, calls incoming over lines L1 to L20 under normal key telephone system operation would be completed through the respective line circuits LC1 and LC20 to attendant consoles C1 to C3 or supervisor console SC1. For discussion purposes let us now assume that a line, such as line L1, is connected through the associated line circuit LC1 to attendant console C1. Also let us assume that it is determined by the attendant at console C1 that a transfer connection is to be established between the calling subscriber on line L1 and a subscriber on a selected other line, such as line L20.

Under such a condition, the transfer key is operated at attendant console C1 and circuitry in associated attendant circuit ATT1 responds to the operation of the key by providing a special signal for transmission back through attendant console C1 and line circuit LC1 to the associated auxiliary circuit AUX 1. Auxiliary circuit AUX 1, in response to the special signal, marks line L1 in a distinctive manner. In addition, auxiliary circuit AUX 1 enables the input selector 6IN and also enables the first idle transfer bridge, such as transfer bridge TB1.

As a result of the enabling of the transfer bridge, the input selector 6IN sequentially steps one position at a time hunting for the marked line. When the 6IN selector stops at the position associated with marked auxiliary circuit AUX 1, line circuit L1 is connected through the selector to the input of transfer bridge TB1. At that time a tone is returned over the tranmission lead pair of line L1 to the attendant at attendant console C1. The attendant thereupon selects the line over which a transfer connection is to be established and operates the pickup key associated with the selected line.

Under control of attendant circuit ATT1, tne auxiliary circuit associated with the selected line (in our example auxiliary circuit AUX 20 associated with line L20) is enabled to mark the leads associated with line L20. Under control of auxiliary circuit AUX 20, output selector 6OUT is enabled and again sequentially scans each line in turn until the marked line L20 is detected. When the selector scans position 20, the selector stops and line L20 is connected through output selector 6OUT to the output of transfer bridge TB1.

The attendant at console C1 may communicate with the called subscriber on line L20 privately and when it is determined that the transfer connection can be completed between lines L1 and L20, transfer bridge TB1 is enabled and a connection is established between the two lines. The attendant is then free to handle terminating or originating connections on other lines.

1.1 Overflow Operation

Under the condition that all attendant positions are busy and an overflow key is operated on the supervisor console SC1 and a call is incoming over one of the lines not currently connected to an attendant console, the overflow system, under control of common control circuits CC1 and CC2, become activated. Under such a condition, the auxiliary circuit associated with the overflow incoming line marks that line and enables the input selector 6IN to again hunt for the marked line. Under control of the input selector, the marked line is connected through transfer bridge TB1 to the associated overflow trunk circuit OFT1 and a connection is thereby established from the overflow line through the overflow trunk circuit to the overflow trunk associated therewith, all under control of common control circuits CC1 and CC2.

1.2 Night Service

When the night service key is operated on a supervisor console SC1, any incoming active line L1 through L20 is marked under control of the associated auxiliary circuit and the selector 6IN connects the marked line through transfer bridge TB1 and through the overflow trunk circuit OFT1 and via common control circuit CC2 to the night service position, or to the night service trunk.

2.0 Detailed Description

Turning now to FIG. 2, when a calling connection is directed from the central office over a particular line, ringing potential is transmitted over the T1-C and R1-c leads to the key telephone line unit LC1 associated with the called line. The line functions in the well-known manner, as set forth in U.S. Pat. No. 3,436,488 issued to R. E. Barbato and D. T. Davis on Apr. 1, 1969, such that flashing potential is extended over lead L1 and cable 232 to FIG. 7 to light the line lamp 7L1 in a flashing manner.

When the attendant at any console, such as console Cl (FIG. 7), operates tthe pickup key associated with the flashing potential, network 701 is connected across the T1 and R1 leads and a calling connection is established between the calling subscriber and the attendant at the answering console.

2.1 Transfer Connection

Assume at this point that the calling party on line L1 (lamp 7L1) desires to speak with a party on some other line associated with the key telephone console, such as, for example, line L20 (lamp 7L20). In this situation the attendant operates the transfer key 7TR at the console.

Figure 13:
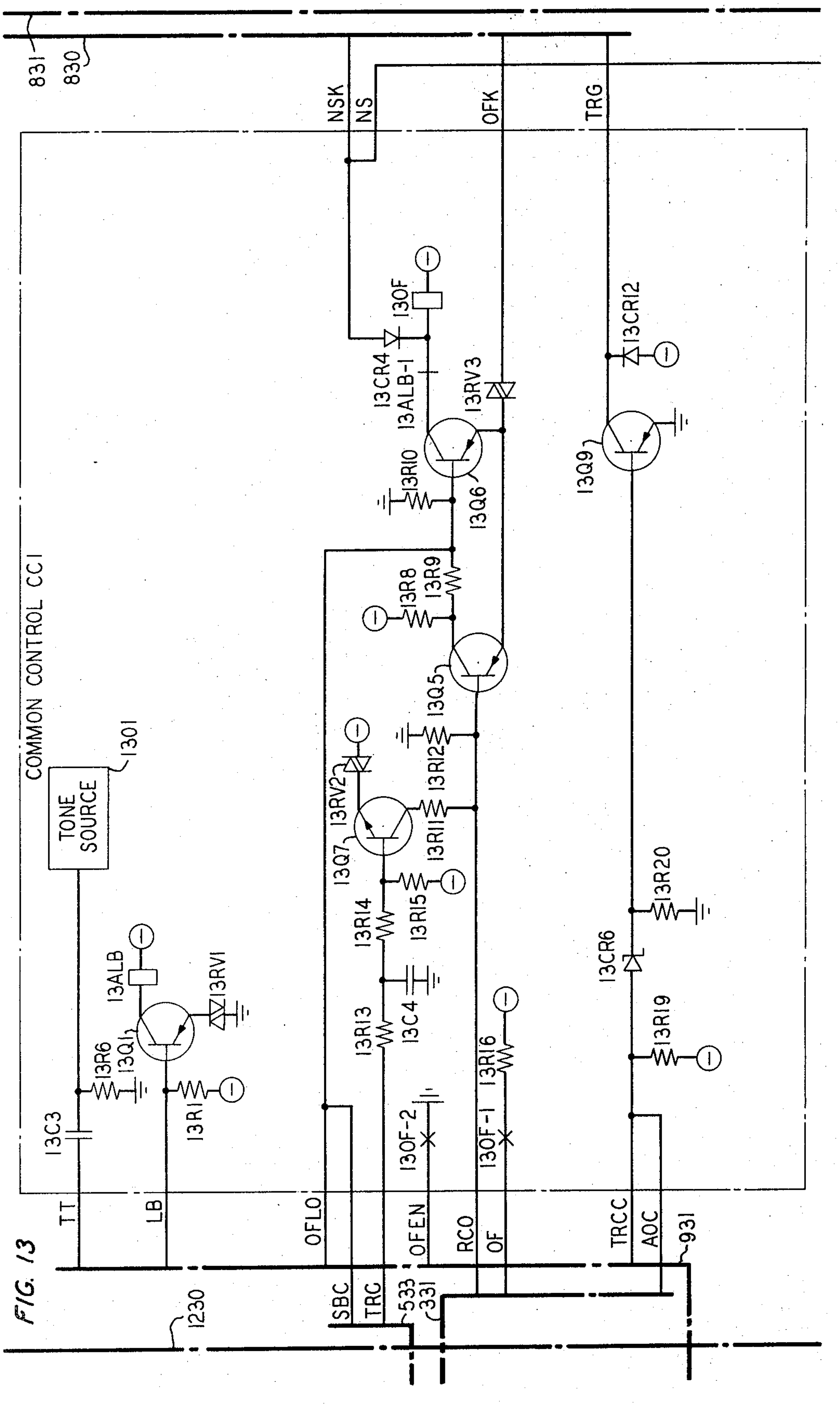

Digressing momentarily and turning to FIG. 13, transistor 13Q9 is turned on from battery through resistor 13R19 and zener diode 13CR6. Ground from the emitter collector junction of transistor 13Q9 is extended over lead TRG and cable 830 to FIG. 8. When the 7TR key is operated, this ground is extended over lead STR1 and cable 532 to FIG. 5 thereby operating relay 5ATR1. When the 5ATR1 relay operates, it locks operated to the turned on 5Q1 transistor.

Transistor 5Q1 is on at this time from ground supplied to the emitter from varistor 5RV1 and to negative potential supplied to the base via the A11 lead. Negative potential is on the All lead at all times when the associated console is connected to a line. This is accomplished by extending lead All over cable 532 to FIG. 7 and via the enabled pickup key contact, in this case pickup key contact 7PU1-3, and over cable 232 to FIG. 2 and to the associated line circuit LC1 and through the winding of relay 2A to negative battery. The importance of this path will become clearer from that which is to follow, but at this point it should be noted that the 2A relay in the line circuit is operated and held operated over the path just described. This path, and particularly lead All, is in conventional key telephone systems commonly referred to as the "A" lead path and is used for control purposes.

Returning again to FIG. 5, transistor 5Q1 can only turn on when the console associated therewith is connected to an active line circuit since the negative potential necessary to supply current to the base of the transistor is supplied over the path described above from the line circuit.

When relay 5ATR1 operates in response to the enabling of the transfer key, the ground potential supplied over lead All from varistor 5RV1 and the emitter base junction of the transistor and break contact 5ATR1-2 is raised to a more negative voltage potential (negative voltage logic) by the insertion of resistor 5R4 in the path via the enabling of break contact 5ATR1-2.

Figure 3:
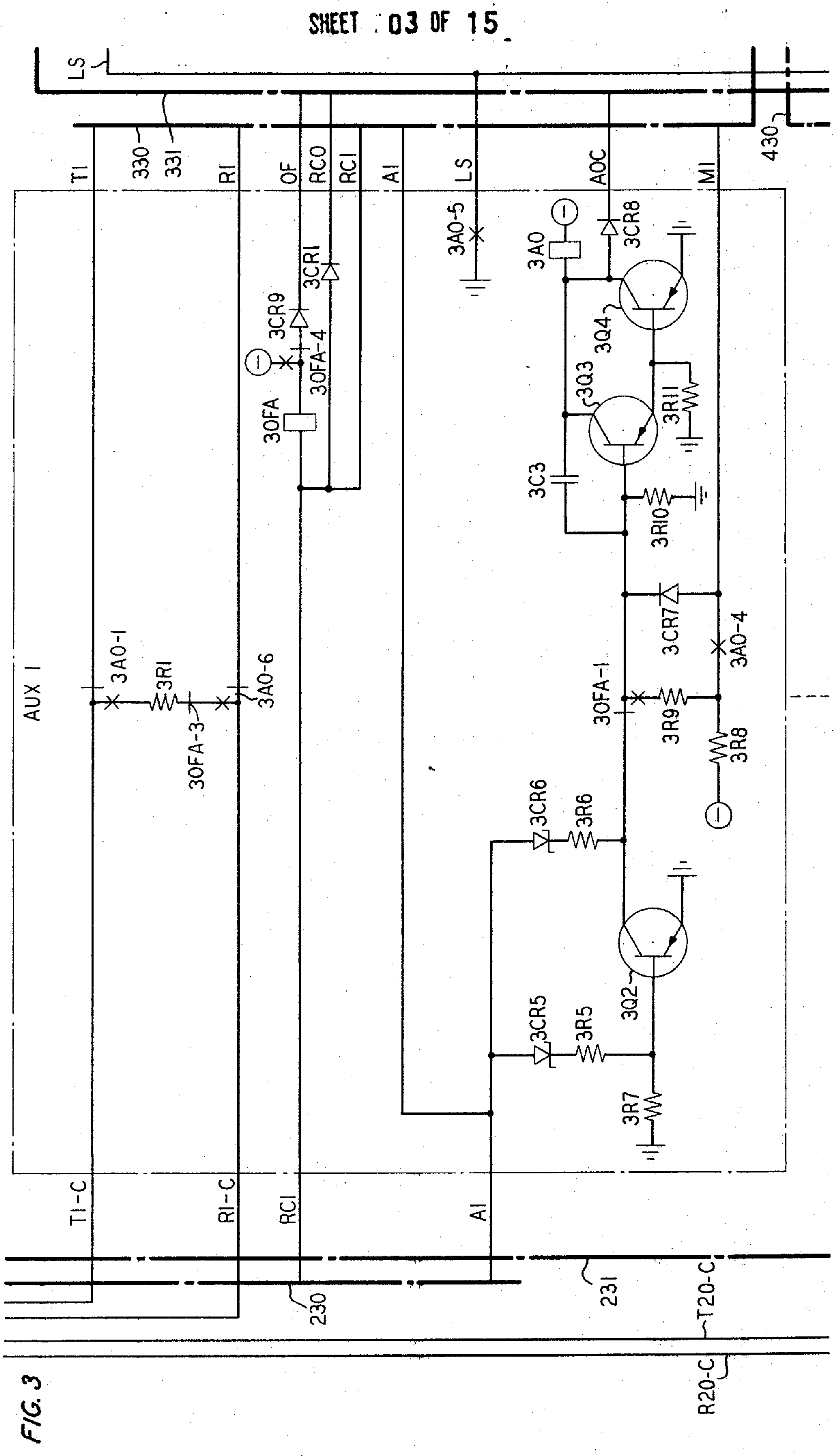
Figure 4:
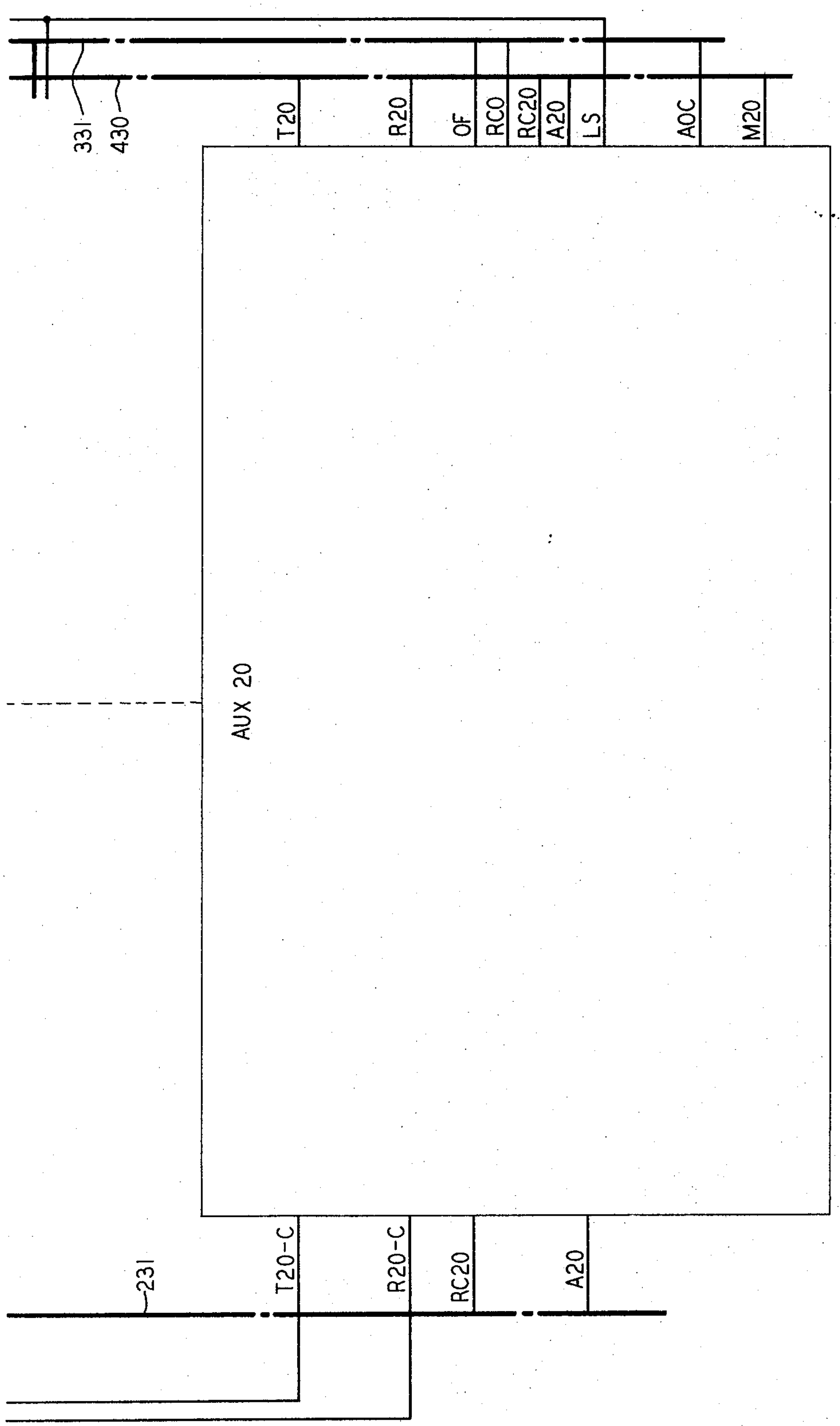

Turning now to FIG 2, lead A1 is extended through the line circuit LC1 and over cable 230 to the associated auxiliary circuit AUX 1, FIG. 3. Thus, when resistor 5R4 is inserted into the path of lead A1 and the voltage raises from ground to a point approximately midway between ground and negative 20 volts, transistors 3Q2, 3Q3 and 3Q4 turn on. Transistor 3Q4 turning on enables relay 3A0, the add-on relay. Relay 3A0 operating marks the line that the attendant is presently connected to for transfer purposes. This is accomplished in two ways: first, a ground is extended over lead LS via enabled make contact 3A0-5; and, second, a resistive battery is extended over lead M1 via enabled make contact 3A0-4. These two control leads feed the transfer circuit and, in the manner to be discussed hereinafter, cause that circuit to hunt for the marked line. When the transfer circuit finds the proper line, that line is connected to the input of the transfer circuit.

Relay 3A0 operating places a hold bridge, resistor 3R1, across the communication leads T1-C and R1-C back to the calling subscriber via enabled make contacts 3A0-1 and 3A0-6.

2.2 Transfer Circuit Selector Operation

Figure 5:
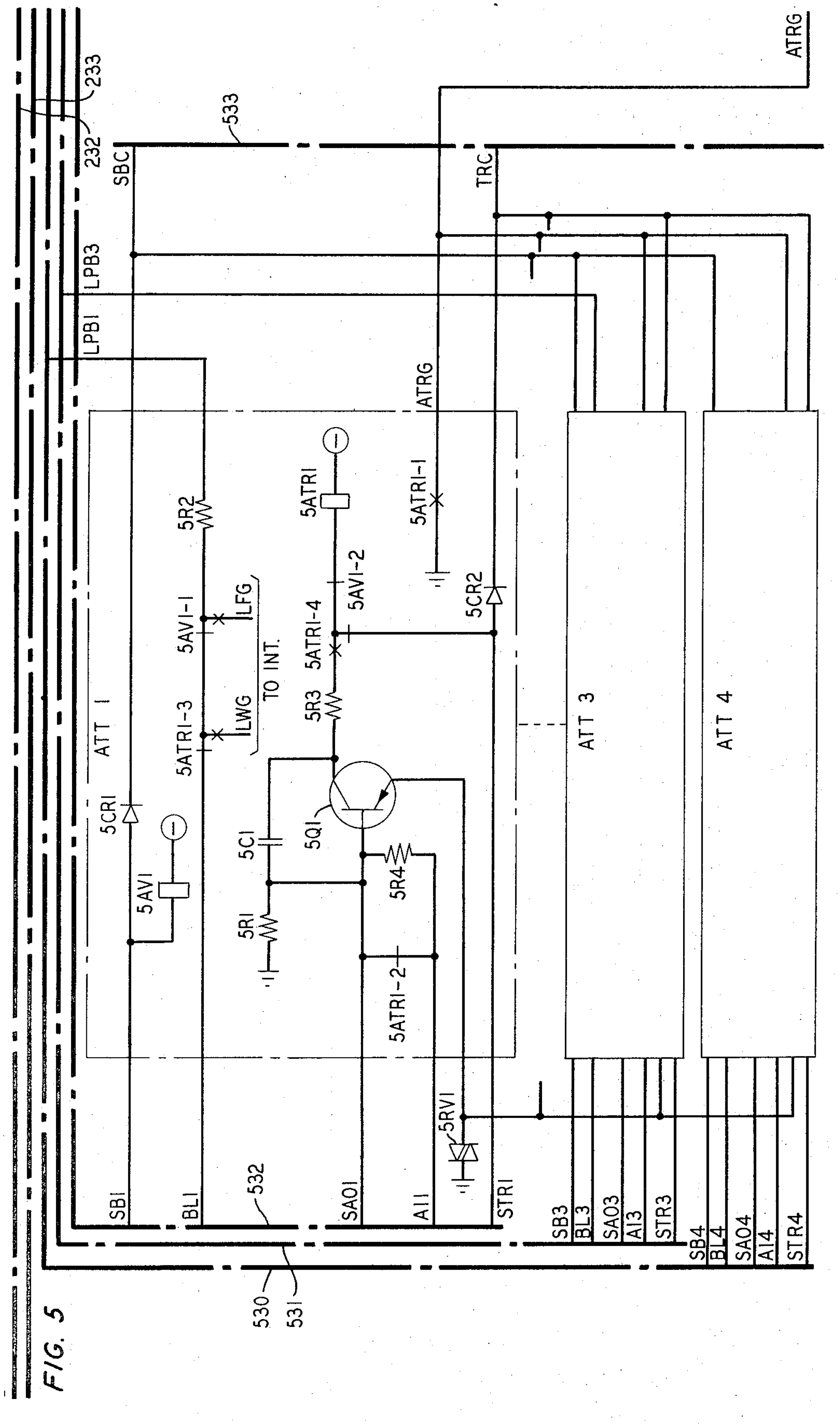
Figure 6:
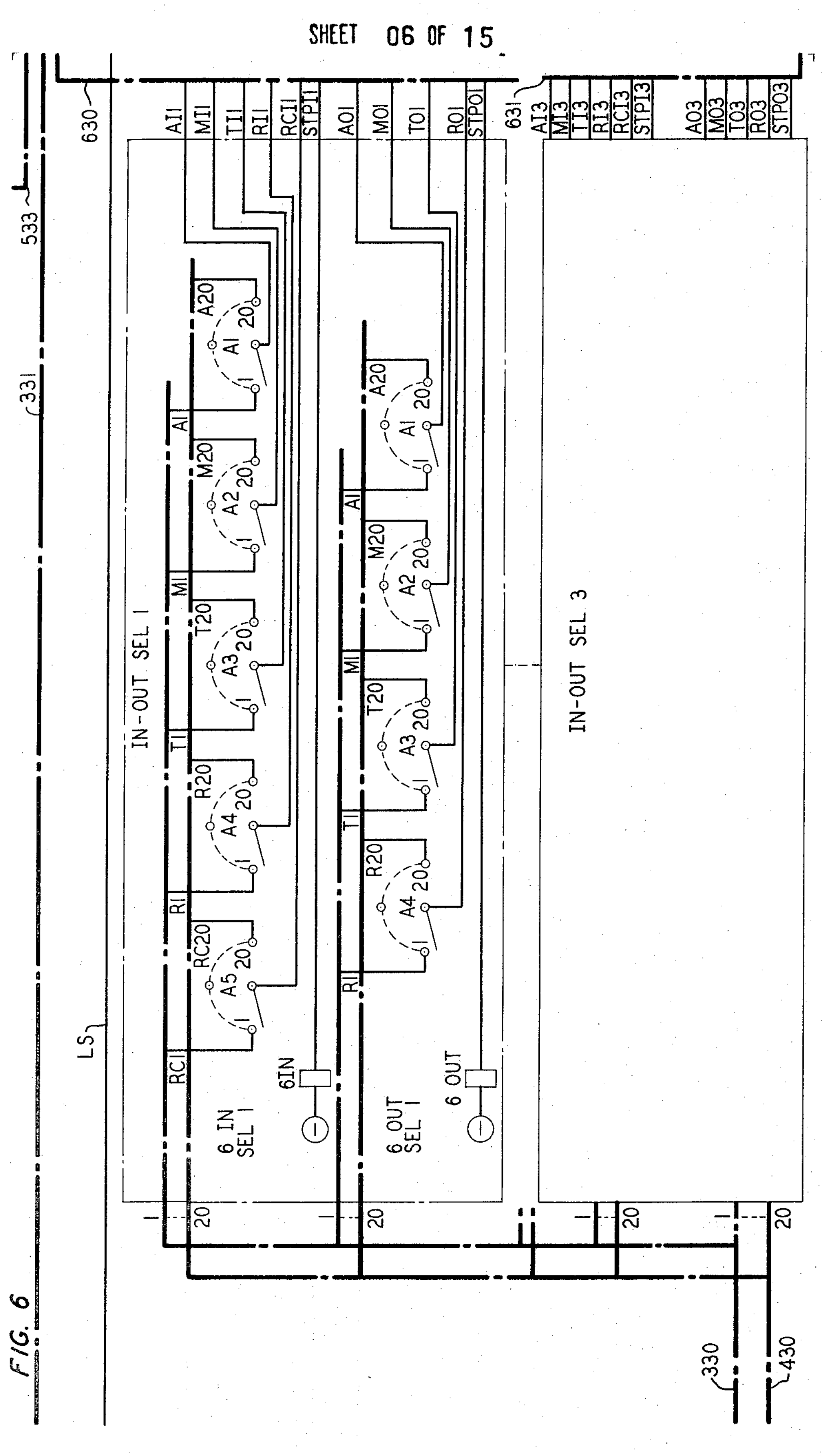
Figure 9:
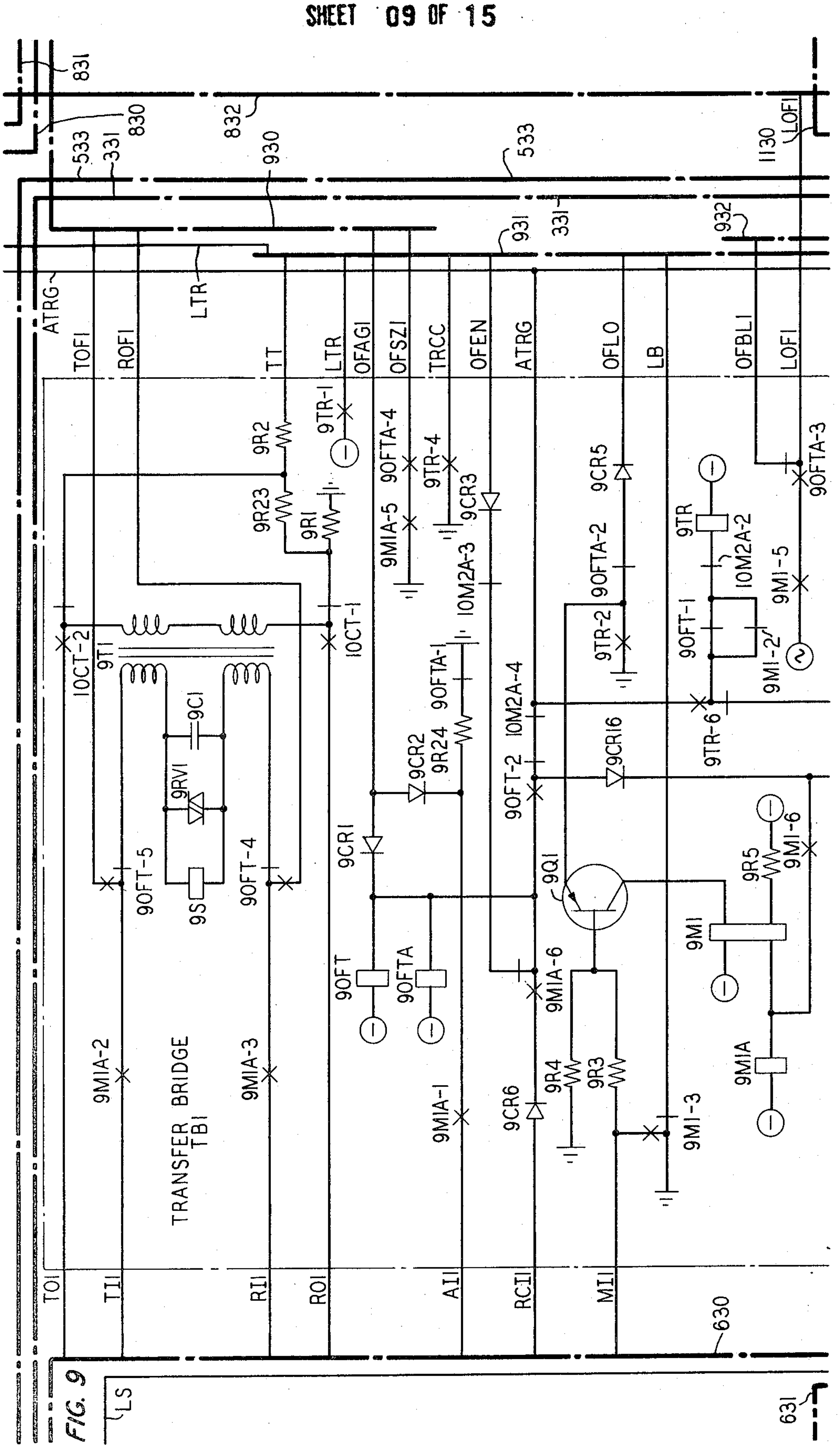
Figure 10:
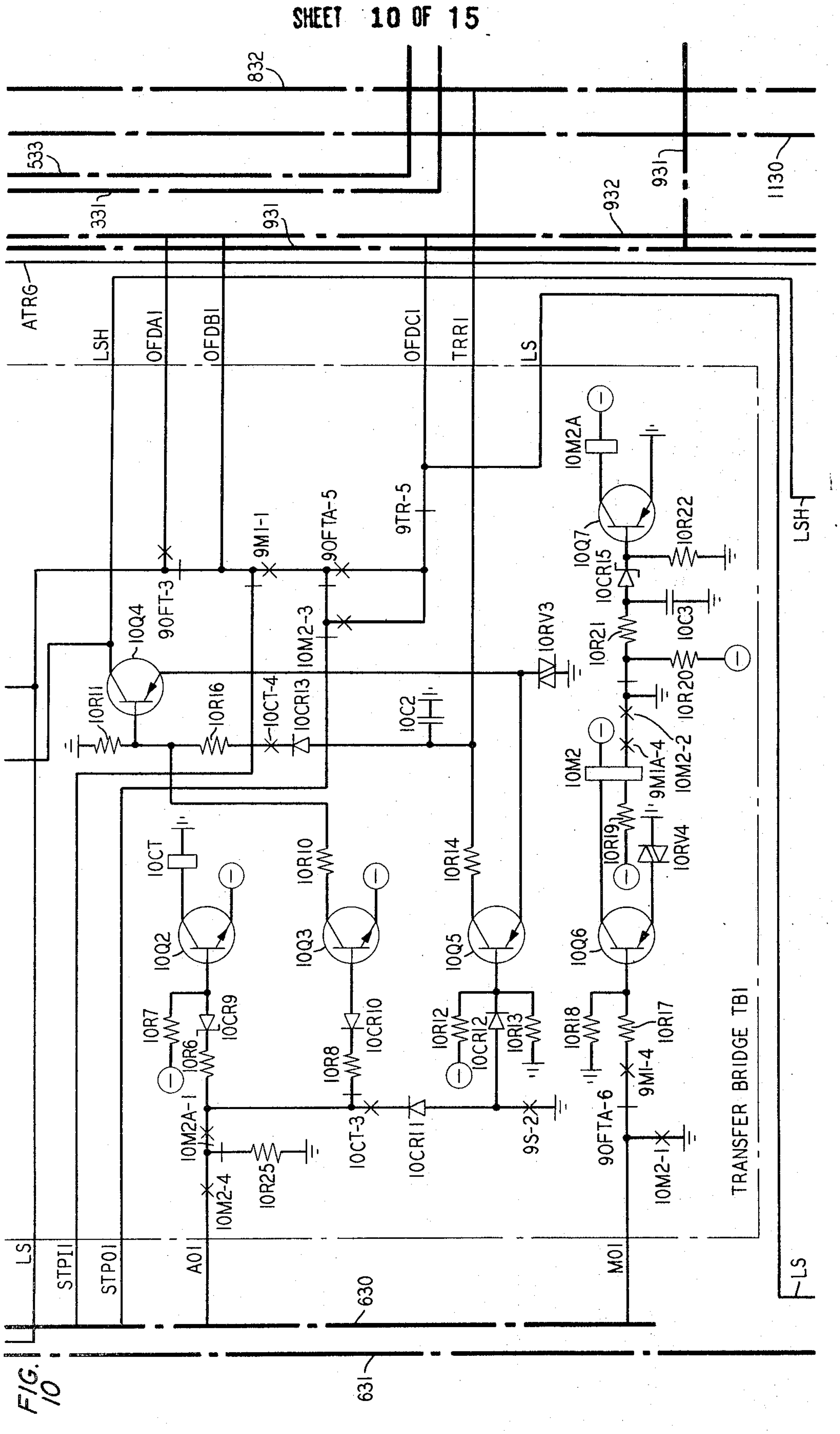

The ground on the LS lead is extended to FIG. 10 and through released break contacts 90FT-3 and 9M1-1 and over the STPI1 lead to FIG. 6 which causes the stepping selector switch 6INSEL1 for the first link selector 6IN to operate. The stepping selector moves one position at a time until the wiper or level A2 contacts a position having negative battery thereon. Since the different positions of switch level A2 are connected to the M- leads of each auxiliary line circuit, the selector steps to the line circuit marked in the manner discussed above. Thus, since in our example the attendant was connected to the first line when the transfer key was operated, the selector switch 6IN1 moves to the first position. In that position, resistance battery from lead M1 is extended over lead MI1 to FIG. 9, thereby turning on transistor 9Q1. Transistor 9Q1 turning on operates relay 9M1 which causes the operation of relay 9M1A which relay operates from ground supplied via enabled make contact 9M1-6, diode 9CR16, released break contacts 90FT-2 and 10M2A-4 and lead ATRG from FIG. 5 and enabled make contact 5ATR1-1.

When the 9M1 relay operates, ground is extended via enabled make contact 9M1-3, FIG. 9, and lead MI1 of cable 630 to FIG. 6 and back through the 6IN selector and over lead M1 to FIG. 3 thereby turning off transistors 3Q3 and 3Q4 and releasing the 3A0 relay. The T1-C and R1-C leads, FIG. 3, from the central office now bypass the hold bridge, via released break contacts 3A0-1 and 3A0-6, and are connected through the 6IN selector, levels A3 and A4, position 1 and are extended to the input of transfer bridge TB1, FIG. 9, via leads TI1 and RI1. The communication leads TI1 and RI1 are connected through enabled make contacts 9M1A-2 and 9M1A-3 and released break contacts 90FT-5 and 90FT-4 and through transformer 9T1 to the coil of relay 9S. Relay 9S thus acts as a hold bridge for the calling line. This condition is communicated to the attendant by a tone which is supplied from the common control circuit CC1, FIG. 13, tone source 1301 via capacitor 13C3 and lead TT of cable 931 to FIG. 9 and via resistor 9R2 and released break contacts 10CT-2 and 10CT-1 through to the secondary of transformer 9T1 to ground via resistor 9R1. This tone is extended through transformer 9T1, released break contacts 90FT-5 and 90FT-4, enabled make contacts 9M1A-2 and 9M1A-3 and leads TI1 and RI1 of cable 630. Since the attendant is bridged across these leads, the tone is returned indicating that the line has been connected to the input of a transfer bridge.

2.3 Establishment of a Called Line to the Transfer Bridge

When the attendant observes tone on the line, an idle outgoing line, such as line L20, is selected and the pickup key associated therewith operated. Since the original connection is being held by the selected transfer bridge, that connection is not released when the second pickup key is operated. When the attendant observes dial tone on the second selected line, the digits associated with the destination station desired are dialed or key pulsed.

Figure 7:
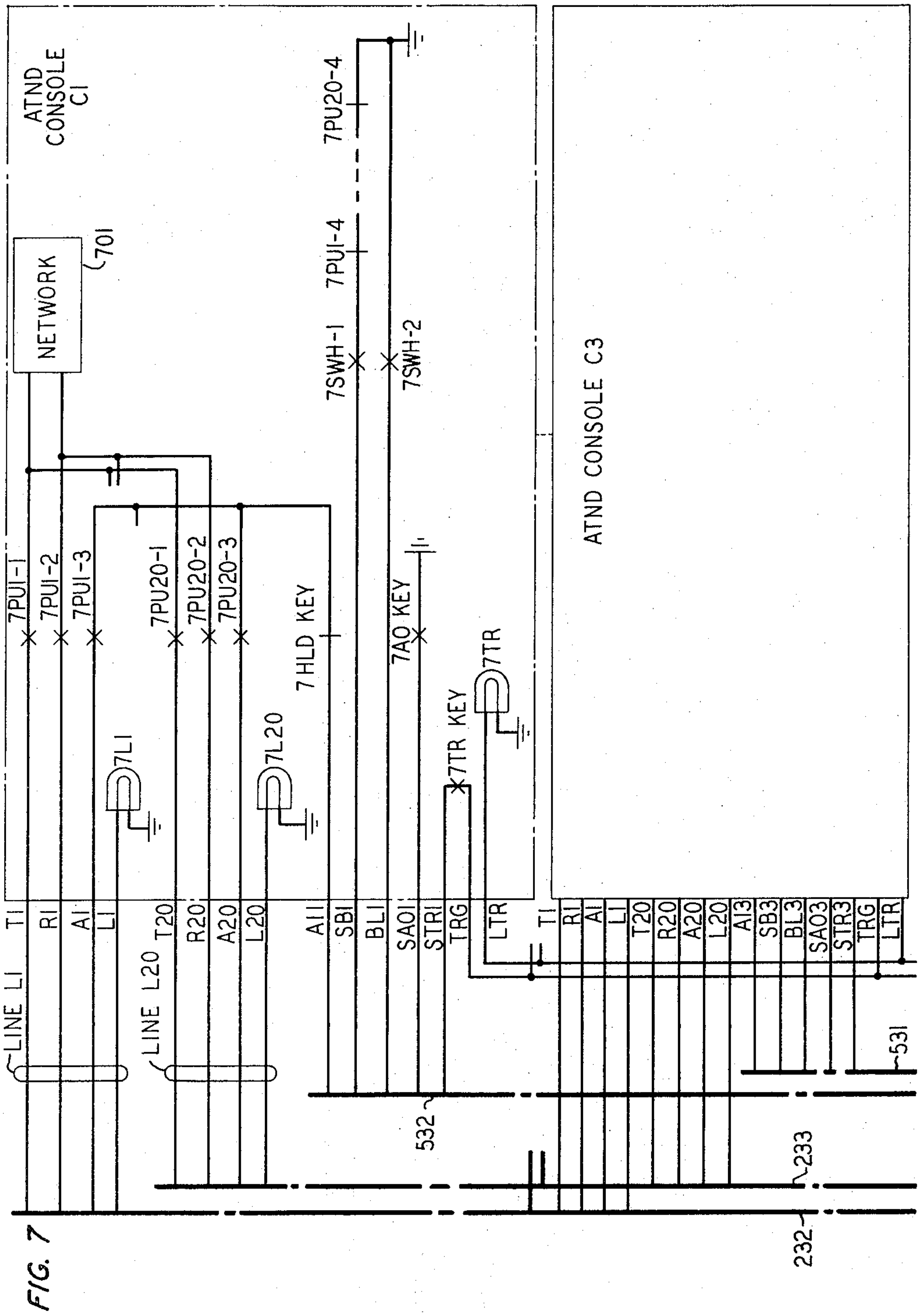

When the attendant seizes the second or out line, the 5ATR1 relay, FIG. 5, remains operated and the 5R4 resistor remains in series with the All lead associated with the attendant's console since the 5ATR1 relay is operated from the 5Q1 transistor which is still in the on state. Accordingly, when the pickup key, such as pickup key 7PU20, FIG. 7, is operated on the selected out line, the potential on lead All is extended over lead A20 to FIG. 2 to operate the 2A relay in line circuit LC20 (not shown). Thus, the 3Q2, 3Q3 and 3Q4 transistors and the 3A0 relay turn on in auxiliary circuit 20, FIG. 4 (all not shown).

Keeping in mind that auxiliary circuit AUX 20 which serves line L20 is identical to auxiliary circuit AUX 1 which serves line L1, the circuit operation of auxiliary circuit AUX 20 will be discussed with reference to auxiliary circuit AUX 1, FIG. 3. Accordingly, as shown in FIG. 3, when the voltage potential is extended over the A- lead, transistors 3Q2, 3Q3 and 3Q4 turn on, thereby operating the 3A0 relay. Ground is supplied to the LS lead through enabled make contact 3A0-5 and resistance battery is applied over the M- lead, in this case M20 (FIG. 4) lead, of cable 330.

Turning now to FIG. 10, ground on the LS lead is extended through the released break contact 90FT-3 and enabled make contact 9M-1 and released break contacts 90FTA-5 and 10M2-3 and over the STPO1 lead of cable 630 to FIG. 6 to operate the stepping selector switch 6OUT1 of output selector 6OUT.

Returning for a moment to FIG. 10, it will be seen that the ground on the LS lead has now been steered from the STPI1 lead to the STPO1 lead via the enabling of transfer contact 9M1-1. Thus, on the first line connected to the console, when the attendant operates the transfer key, an input selector is enabled and connects the line then associated with the console to the transfer bridge. In a similar manner, when the attendant operates a pickup key associated with a selected second line, an output selector is enabled to complete a connection from the selected out line to the output of the transfer bridge circuit. This operation will now be discussed with reference to FIG. 6.

When the output selector 6OUT is enabled, the A2 wiper of the switch begins to hunt for resistance battery on an associated M- lead. Since, as has been discussed before, the negative potential on the M- lead associated with the calling line which had caused input selector 6IN to stop at position 1 has been removed, the output selector 6OUT is free to step continuously unitl the resistance battery is detected at position 20. Thus, when wiper A2 arrives at position 20, negative battery is extended over lead M01 and cable 630 to FIG. 10 and via released break contact 90FTA-6, enabled make contact 9M1-4 and resistor 10R17 to turn on transistor 10Q6 thereby operating relay 10M2, which relay locks operated from battery through resistor 10R19, enabled make contacts 9M1A-4 and 10M2-2 to ground. Capacitor 10C3 in conjunction with resistors 10R20 and 10R21 forms a delay circuit for transistor 10Q7. Thus relay 10M2A operates approximately 100 milliseconds after the operation of relay 10M2.

When relay 10M2 operates, ground is extended back over lead M01 to FIG. 6 and via level A2 of output selector 6OUT to FIG. 3, thereby turning off transistors 3Q3 and 3Q4 and releasing relay 3A0. the T1-C and R1-C communication leads from the central office associated with line L20 are now extended via FIG. 6 through selector levels A3 and A4 of output selector 6OUT and over leads T01 and R01 and cable 630 to FIG. 9 and via make contacts 10CT-2 and 10CT-1 to the transfer bridge TB1. At this point the primary of the 9T1 transformer is connected to the communication leads from the calling line but the communication leads from the just-established station have not as yet been connected through to the first station because of the released connection of relay 10CT. This operation gives the attendant an opportunity to communicate privately with the called party prior to establishing a transfer connection.

When the attendant determines that the connection between the two lines should be completed, the nonlocking add-on key 7A0 is operated momentarily at the attendant console C1, FIG. 7. Ground is thereby extended over lead SA01 of cable 532 to FIG. 5 to turn off transistor 5Q1 thereby releasing relay 5ATR1. When relay 5ATR1 releases, resistor 5R4 is shunted out of the All lead path via released break contact 5ATR1-2 and thus solid ground from lead SA01 is extended over lead All of cable 532 and through the attendant console via the enabled pickup key associated with the second selected line, and over lead A20 via cable 233 to auxiliary circuit AUX 20, FIG. 4, and, as is shown in FIG. 3 with respect to lead A1, this ground is extended over lead A20 of cable 330 to FIG. 6 and through level A20 of output selector 6OUT and over lead A01 of cable 630 to FIG. 10 and via enabled make contact 10M2-4 and now enabled make contact 10M2A-1 and via resistor 10R6 and zener diode 10CR9 to turn on transistor 10Q2 thereby operating relay 10CT. Zener diode 10CR9 is a threshold diode such that it prevents transistor 10Q2 from turning on from negative potential on lead A01. As shown in FIG. 9, when the 10CT relay operates, the transmission leads T01 and R01 from the selected output line are connected to the secondary of transformer 9T1 and at this point the calling line and the called line are in communication with each other.

For supervisory purposes, when the first line was connected to the primary of transformer 9T1, relay 9S operated placing ground on the base of transistor 10Q5, FIG. 10, via enabled make contact 9S-2 and diode 10CR12. Transistor 10Q5 turning on turns on transistor 10Q4. Ground via varistor 10RV3 is extended through transistor 10Q4 to provide a holding ground for relays 9M1 and 9M1A. Relay 10CT remains operated from ground via enabled make contact 9S-2, diode 10CR11, enabled make contact 10CT-3, resistor 10R6 and zener diode 10CR9 to the base of transistor 10Q2, thereby maintaining the connection between the first and second lines via transfer bridge TB1. Thus the attendant may withdraw from the connection merely by operating a pickup key associated with any other line appearing at the console and supervision will be maintained automatically.

2.4 Link Selection and Lock-out Operation

As shown in FIG. 6, 9, 10 and 11, our system can be arranged with more than one transfer bridge. The particular one of the transfer bridges selected is selected automatically upon operation of the transfer key by the attendant, depending upon the busy-idle condition of the respective bridges. Also, we have arranged the system to ensure that when a calling connection is established to the input of one of the transfer bridges the proper called connection associated therewith is connected to the output of the same transfer bridge. Thus, only one attendant may have access to the transfer bridge circuitry at a particular time. This is accomplished by controlling the operation of relay 5ATR1. As discussed previously, when the 5ATR1 relay operates, the 3A0 relay, FIG. 3, also operates from turned on transistor 3Q4. Thus, ground via diode 3CR8 is extended over lead A0C of cable 331 to FIG. 13, which ground is extended via zener diode 13CR6 thus turning off transistor 13Q9 thereby removing the ground from the TRG lead. The TRG lead, it will be recalled, supplies the ground potential for operating relay 5ATR1. Accordingly, only one attendant at a time may control the transfer function.

As shown in FIG. 7, a visual indication is given to the attendants at all of the consoles that the transfer function is being utilized. The 7TR lamp performs this function from potential on lead LTR from FIG. 9 enabled make contact 9TR-1. The 9TR relay is operated when the transfer bridge is being used for the establishment of a connection from ground supplied on lead LS, FIG. 10, in a straightforward manner. When relay 9TR operates, it locks operated via enabled make contact 9TR-6 to ground supplied over lead ATRG from FIG. 5 and enabled make contact 5ATR-1.

At the completion of the transfer function when both the called and calling lines are connected to the transfer bridge and relay 10M2A operates, relay 9TR releases thereby turning off the 7TR lamp on the consoles as an indication that the transfer circuitry is again available for the completion of transfer connections, even though the associated transfer bridge is now busy.

Figure 11:
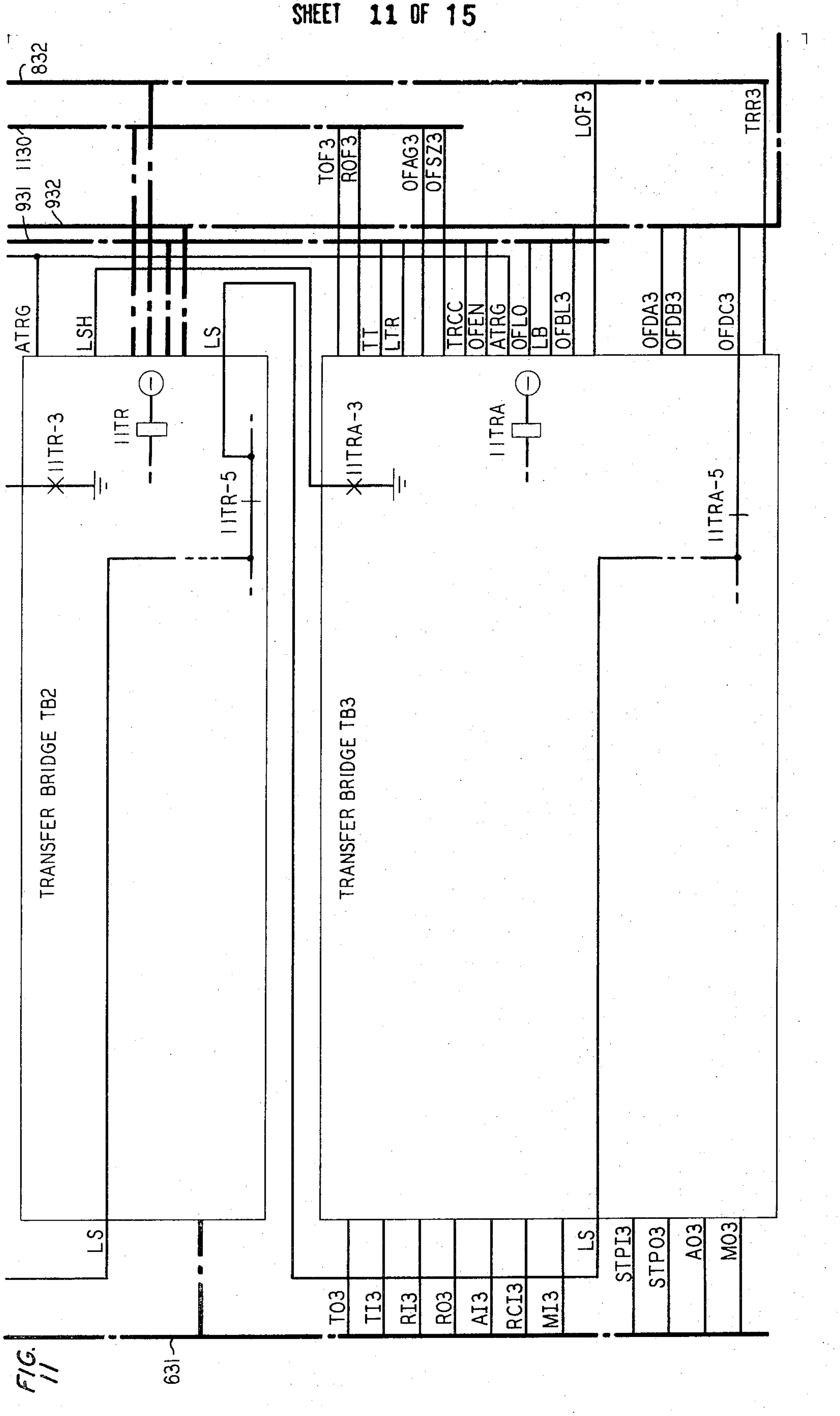

As shown in FIG. 10, assuming that transfer bridge TB1 is busy and the transfer connection circuitry is idle, when ground appears on lead LS as a result of the initiation of another transfer connection that ground is extended via released break contact 90FT-3 and enabled make contact 9M-1, released break contact 90FTA-5 and through enabled make contact 10M2-3 (which contact is enabled because of the busy condition of transfer bridge TB1) and via released break contact 9TB-5 (which contact is released because no attendant is presently controlling the transfer connection on transfer bridge TB1) and over lead LS to transfer bridge TB2, FIG. 11, which transfer bridge is arranged in the identical manner to the transfer bridge TB1, FIG. 9 and 10. Thus, as long as at least one transfer bridge remains idle, transfer connections can be completed between calling and called stations under control of circuitry common to all of the transfer bridges.

2.5 Overflow Control of Calling Connections

As discussed previously, the three conditions which must exist before overflow is initiated are: all attendants must be busy handling connections, an overflow key must be operated at the supervisor's console, and a calling connection must be directed to the key telephone system over one of the lines not currently in communication with an attendant console.

Figure 8:
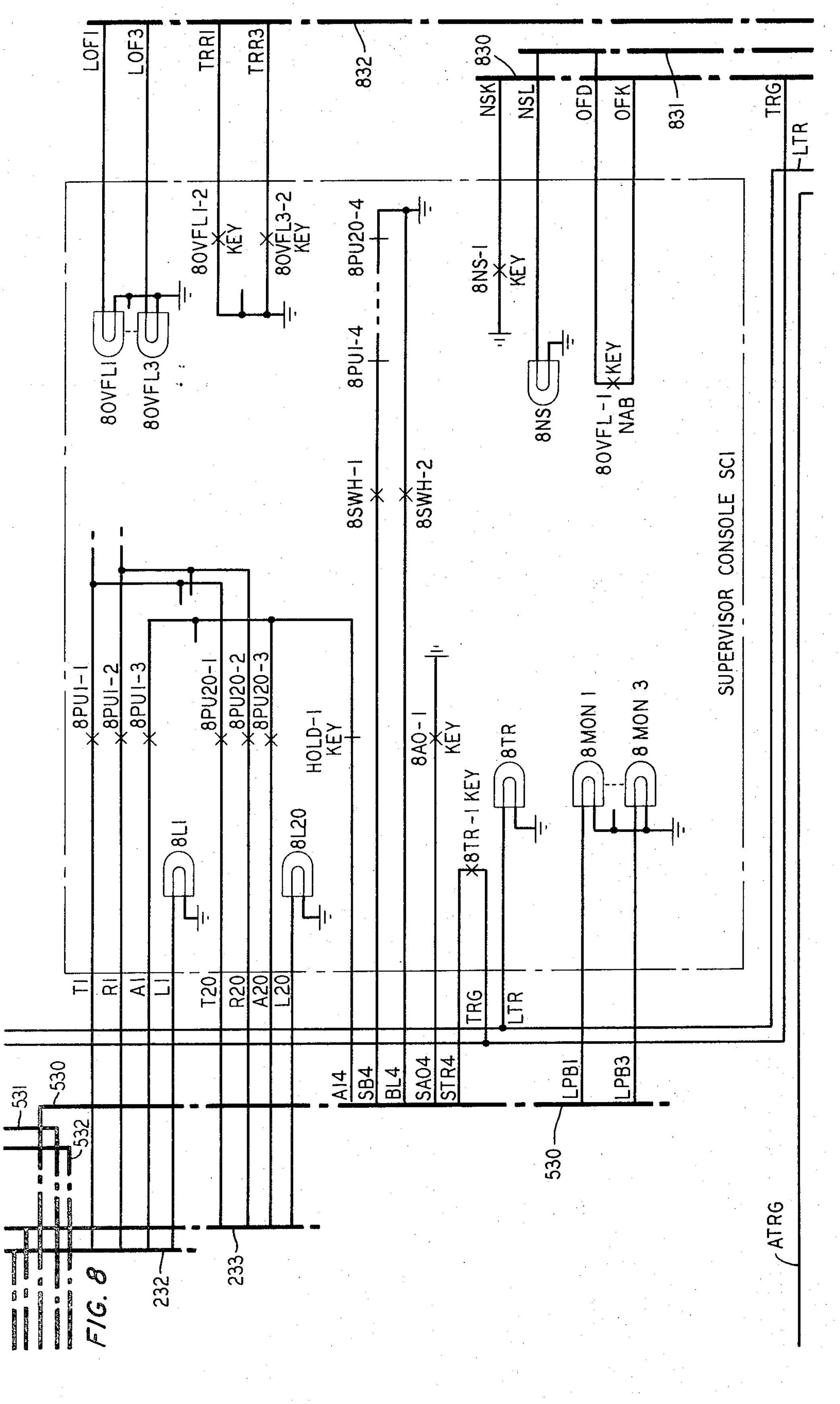

When the overflow key 80VFL at the supervisor console SC1, FIG. 8, is operated, ground is extended via released break contact 140FD1-4 (FIG. 14) and lead OFD of cable 831 to FIG. 8 and through the overflow key contact 80VFL-1 and over lead OFK of cable 830 to FIG. 13 and via varistor 13RV3 thereby supplying ground to the emitters of transistors 13Q5 and 13Q6. At this time transistor 13Q7 is on, thereby supplying negative potential to the base of transistor 13Q5 via resistor 13R11 turning transistor 13Q5 on. The ground from the emitter of transistor 13Q5 thus maintains transistor 13Q6 off at this time.

The base of transistor 13Q5 is connected to each line circuit via lead RC0 of cable 331 and, as shown in FIG. 3, is connected to the 3CR1 diode of each of the auxiliary circuits associated with each of the lines. Thus, when any line circuit, such as line circuit LC1, FIG. 2, associated with line L1 detects an incoming call, ground is supplied over lead RC1, FIG. 2, via enabled make contact 2B-2 and released break contact 2C-3 and over cable 230 and through the associated auxiliary circuit, such as auxiliary circuit AUX 1, and through the forward biased diode 3CR1 and lead RC0 to the base of transistor 13Q5, FIG. 13, thereby turning transistor 13Q5 off. Negative battery from resistor 13R8 is then supplied to the base of transistor 13Q6 thereby turning on that transistor so as to supply ground via released break contact 13ALB-1 to the coil of relay 130F. Relay 130F thereby operates.

Note at this point that if ground were present on lead SBC, FIG. 13, transistor 13Q6 would remain off and the overflow condition would not be initiated. The SBC lead is extended back over cable 533 to FIG. 5 and is connected to each attendant console via the respective 5CR1 diode in the attendant circuit ATT1, FIG. 5. The 5CR1 diode is connected to the respective console via lead SBl, and to ground through the enabled switchhook contact 7SWH-1. Thus, if an attendant is on-hook awaiting termination of a call, ground will be present on the SB1 lead and, as shown in FIG. 13, transistor 13Q6 will remain turned off. Thus, at this point, assuming an incoming call on line L1 and assuming that all attendants are busy, the absence of ground on lead RC0, FIG. 13, will cause relay 130F to operate in the manner previously described.

When relay 130F operates, ground is extended via enabled make contact 130F-2 and lead OFEN of cable 931 to FIG. 9 and via forward biased diode 9CR3 and released break contacts 10M2A-3 and 9M1A-6 to operate relays 90FT and 90FTA.

Transfer bridge TB1, FIG. 9, is now in the overflow mode as opposed to the transfer mode and the bridge is now prepared to initiate the selector selection process to hunt for the line on which the overflow call is coming into the system. Thus, the overflow line must be marked in the manner previously described and this occurs, as shown beginning on FIG. 13, from battery via resistor 13R16 and enabled make contact 130F-1 and lead OF of cable 331 to FIG. 3 and via forward biased diode 3CR9 and released break contact 30FA-4 to one side of the winding of relay 30FA. The other side of the winding of the 30FA relay is connected to ground on the RC1 lead as previously described.

When relay 30FA operates, negative battery is extended from resistor 3R8 through resistor 3R9 and enabled make contact 30FA-1 to the base of transistor 3Q3 thereby turning on that transistor and causing the operation of relay 3A0. When relay 3A0 is operated, negative battery is extended over lead M1 and ground is extended over lead LS. Ground on lead LS is extended to FIG. 10 and via enabled make contact 90FT-3 and lead OFDAl of cable 932 to FIG. 14 and via released break contact 140FD1-6 and lead OFDB1 of cable 932 to FIG. 10 and via released break contact 9M1-1 and over lead STPI1 to FIG. 6 thereby again enabling the 6IN selector which steps one level of time under control of the wiper of switch level A2 until negative potential is detected on one of the M-leads. In the example described, the selector would step to position 1. Thus, the communication leads T1 and R1 from the calling subscriber are extended through selector levels A3 and A4 and over leads TII and RII of cable 630 to make contacts 9M1A-2 and 9M1A-3 of transfer bridge TB1. When the selector arrives at the marked level, relays 9M1 and 9M1A operate in the manner previously described such that the communication leads TII and RII from the incoming line are extended via enabled make contacts 9M1A-2 and 9M1A-3 and enabled transfer contacts 90FT-5 and 90FT-4 and over leads TOF1 and ROF1 and cable 930 to FIG. 12 to the respective windings of relay 12BS.

Figure 12:
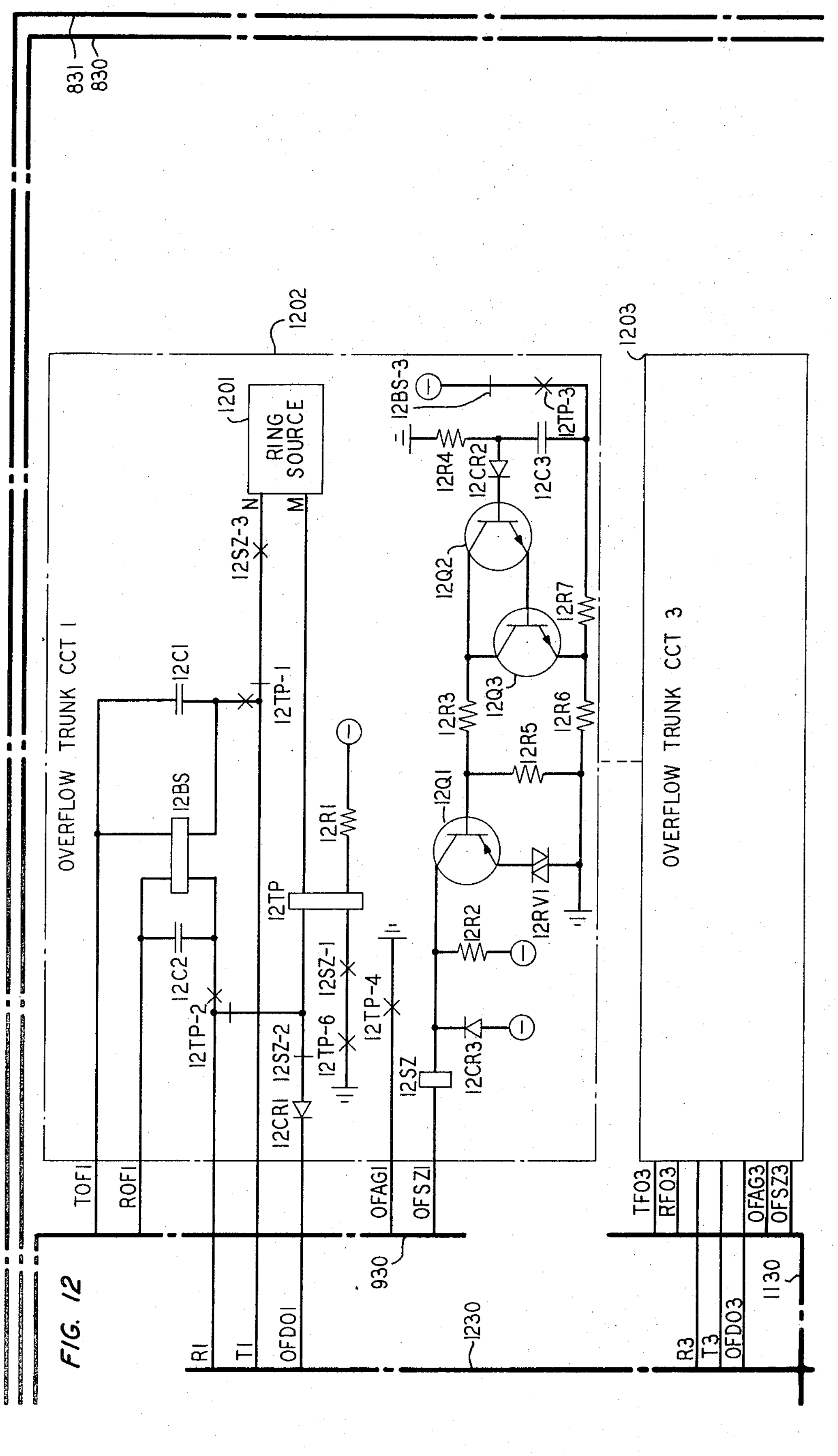

When an overflow connection is established, relay 12SZ in FIG. 12 is operated from ground over lead OFSZ1 of cable 930 from FIG. 9 via enabled make contacts 90FTA-4 and 9M1A-5. Relay 12 SZ operating connects ringing potential from ring source 1201 and lead N via enabled make contact 12SZ-3 and released break contact 12TP-1 and over the T1 lead of calbe 1230 to FIG. 14 and via released break contact 14NS1-1 and over the T1-1 lead to the distant point. A return path from the distant point is completed from lead R1-1 and via released break contact 14NS1-2 and lead R1 of cable 1230 to FIG. 12 and through released break contact 12TP-2 and one winding of relay 12TP to lead M of ring source 1201.

Figure 14:
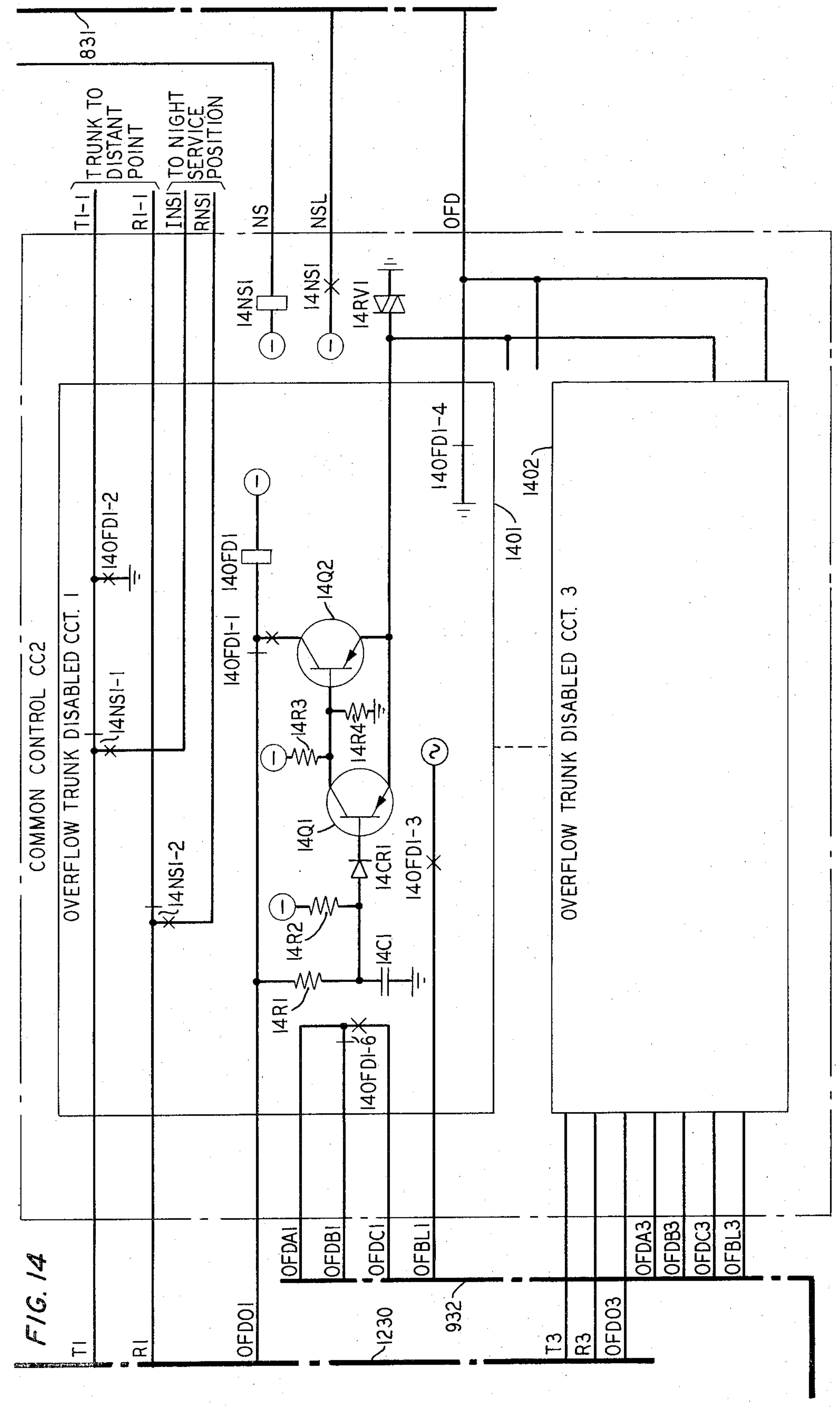
Figure 15:
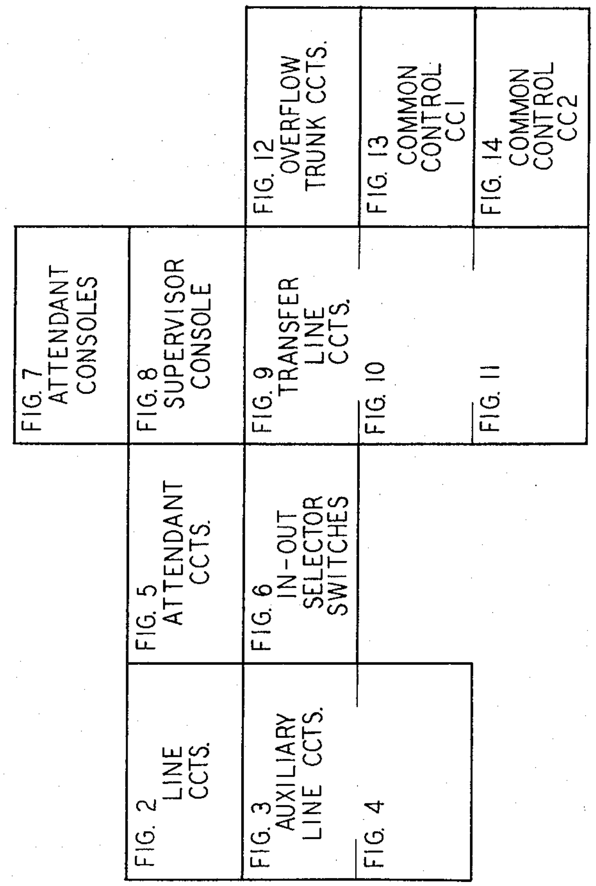
FIG. 15 shows the manner in which the other figures should be arranged.

The station circuit at the distant point responds in the well-known manner to ringing potential on the line such that when the distant station goes off-hook ground is returned over lead R1-1 of FIG. 14 to lead R1 of cable 1230 to FIG. 12 and via released break contact 12TP-2 to operate relay 12TP. Relay 12TP operating trips ringing via transfer contacts 12TP-1 and 12TP-2 thereby establishing a talking connection from leads TOF1 and ROF1, which leads it will be recalled are associated with the overflow incoming line, to the respective coils of relay 12BS and via now enabled make contacts 12TP-2 and 12TP-1 to the leads R1 and T1 to the distant point.

Relay 12TP remains operated at this point from ground through enabled make contacts 12TP-6 and 12SZ-1 and through the secondary relay coil to battery via resistor 12R1. While relay 12TP remains operated, ground is supplied via enabled make contact 12TP-4 and lead OFAG1 of cable 930 to FIG. 9 and through forward biased diode 9CR1 to maintain the 90FT and 90FTA relays operated, thereby holding the transfer bridge in the overflow mode.

As shown in FIG. 12, transistors 12Q1, 12Q2 and 12Q3 form a timing circuit such that when relay 12BS operates and subsequently releases and remains released for a period of time, as determined by break contact 12BS-3 and make contact 12TP-3, the timing circuit operates to release relay 12SZ thereby releasing relay 12TP. When relay 12TP is released, the ground is removed from lead OFAG1 and the transfer bridge is released by the release of relays 90FT and 90FTA. Thus, when the overflow connection is established, control supervision of the connection is transferred to the trunk extending to the distant point.

The overflow feature can be disabled from the distant point if ground is returned over lead R1-1, FIG. 14, which ground is extended over lead R1 of cable 1230 to FIG. 12 and via released break contacts 12TP-2 and 12SZ-2 and forward biased diode 12CR1 over lead 0FD01 of cable 1230 to FIG. 14 thereby operating relay 140FD1 in the overflow trunk disable circuit 1401.

2.6 Overflow Link Selection

It will be recalled that when the overflow incoming line was marked for subsequent hunting, the ground potential on lead LS was extended through overflow trunk disable circuit 1401 and via released transfer contact 140FD1-6. Thus, when the 140FD1 relay is operated, ground via lead 0FDA1 is extended over lead 0FDC1 of cable 932 to FIG. 10 and via lead LS to the second transfer bridge TB2, FIG. 11. Thus, since transfer bridge TB2 is in turn connected to an overflow trunk circuit, such as is shown in FIG. 14, distinct from the first overflow trunk circuit, the overflow connection is completed to a different distant point over a different trunk circuit.

2.7 Night Service

The night service feature operates in much the same manner as does the overflow feature except that the attendants are, of course, idle when the calls are routed forward. As shown in FIG. 8, when the night service key 8NS is operated at the supervisor console SC1, ground is extended over lead NSK and cable 830 to FIG. 13 to operate relay 130F. Ground is also extended over lead NS to FIG. 14 to operate relay 14NS1. Thus, with the 130F and 14NS1 relays enabled, incoming calls, one at a time, are routed through the transfer bridge TB1 to circuit 1401 and via enabled transfer contacts 14NS1-2 and 14NS1-1 to the night service station. Accordingly, incoming calls on many lines are funneled to a single station.

Conclusion

While the equipment of our invention has been shown in a particular embodiment where a group of key telephone stations have been arranged for concurrent operation, it is to be understood that such an embodiment is intended only for illustrative purposes and numerous other arrangements may be devised by those skilled in the art without departing from the spirit or scope of the invention.

For example, the overflow and night service features of our invention could be used with a computer terminal or group of such terminals where a selector could be arranged to connect any one of a number of incoming lines to a machine or may be arranged to route incoming calls to a distant machine when the terminating machine is busy.

Also, it should be understood that even though a selector switch has been shown for controlling connections to the bridge circuit, numerous other arrangements could be utilized. For example, ferreed switches, or relays, or even crosspoint switches could be employed.

What is claimed is:

1. In a key telephone system having
a telephone station,
a plurality of telephone lines associated with said telephone station,
means for directing communication connections from any of said telephone lines to said telephone station, and
means at said telephone station for selectively enabling a communication connection between said telephone station and an exclusive one of said telephone lines, the combination comprising transfer control means associates with said telephone station operable in response to a first signal from said station for marking a first line upon which a communication connection is selectively enabled at the time of said first signal, a bridge circuit having an input and an output, said bridge circuit operable for establishing communication connections between said input and said output, means for selectively connecting any said line either to said input or to said output of said bridge circuit, means operable in response to said marking of said first line for enabling said selectively connecting means to connect said marked first line to said input of said bridge circuit, and means responsive to said connection to said input of said bridge circuit for rendering said selectively enabling means operable for establishing a communication connection between any selected idle one of said lines and said station.

2. The invention set forth in claim 1 further comprising means operative in response to the selective enabling of a connection to a second line from said station for marking said second line, and means operable in response to said marking of said second line for enabling said selectively connecting means to connect said marked second line to said output of said bridge circuit.

3. The invention set forth in claim 2 further comprising means responsive to a second signal from said station for enabling said bridge circuit to establish a communication connection between said first line and said second line.

4. The invention set forth in claim 3 wherein said selective connecting means includes at least one multiposition sequential selector, each position of which is associated with a unique one of said lines.

5. The invention set forth in claim 4 wherein said marking means includes means for establishing a voltage potential on a lead associated with said marked line and wherein said selector is adapted to hunt from one position to the next position sequentially until a position is detected having thereon said marking voltage potential.

6. The invention set forth in claim 1 further comprising an overflow key at said station, means jointly responsive to an operated condition of said overflow key, to an enabled communication connection between a first one of said lines and said station, and to a communication connection directed from a second one of said lines to said station for marking said second line, a communication transmission circuit, means for selectively connecting any said line to said communication transmission circuit, and means operable in response to said marking of said second line for enabling said selectively connecting means to connect said marked second line to said communication transmisssion circuit.

7. The invention set forth in claim 6 wherein said selectively connecting means includes a multiposition sequential selector, each position of which is associated with a unique one of said lines.

8. The invention set forth in claim 7 wherein said marking means includes means for establishing a voltage potential on a lead associated with said marked line and wherein said selector is adapted to hunt from one position to the next position sequentially until a position is detected having thereon said marking voltage potential.

9. The invention set forth in claim 1 further comprising a night service key at said station, means jointly responsive to an operated condition of said night service key and to a communication connection directed from a first one of said lines to said station for marking said first lines, a communication transmission circuit, means for selectively connecting any said line to said communication transmisssion circuit, and means operable in response to said marking of said first line under control of said night service key for enabling said selectively connecting means to connect said marked night service key controlled first line to said communication transmission circuit.

10. The invention set forth in claim 9 wherein said selectively connecting means includes a multiposition sequential selector, each position of which is associated with a unique one of said lines.

11. The invention set forth in claim 10 wherein said marking means includes means for establishing a voltage potential on a lead associated with said marked line and wherein said selector is adapted to hunt from one position to the next position sequentially until a position is detected having thereon said marking voltage potential.

12. A transfer circuit for use in a key telephone system wherein communication connections may be established from any one a number of telephone lines to at least one key station under control of pickup keys at said station, each said pickup key being associated with a unique one of said telephone lines and operable for supplying signals over an "A" lead for controlling communication connections over said associated line, said station including means for establishing transfer control signals, said transfer circuit comprising means responsive to receipt of a said transfer control signal from said station for transmitting over said "A" lead of a currently operative pickup key a marking signal potential, a bridge circuit having an input and an output, means controlled by said marking signal potential for establishing a communication connection from said telephone line associated with said marking potential to said input of said bridge circuit, means controlled by said last-mentioned means for establishing a hold condition with respect to said marked telepnone line, means responsive to the operation of a pickup key associated with a called telephone line while said marked line is in said hold condition for transmitting over said "A" lead of said called line marking signal potential, and means controlled by said marking signal on said called line "A" for establishing a communication connection from said called line to said output of said bridge circuit.

13. The invention set forth in claim 12 further comprising means concurrently operative with said last-mentioned means for releasing said hold condition.

14. The invention set forth in claim 13 wherein said bridge input communication connection establishing means includes a first miltiposition selector, each said telephone line uniquely associated with one of said selector positions.

15. The invention set forth in claim 14 wherein said bridge output communication connection establishing means includes a second multiposition selector, each said telephone line uniquely associated with one of said selector positions.

16. The invention set forth in claim 12 wherein said station further comprises an overflow key and wherein said transfer circuit further comprises a communication circuit, means controlled jointly by the operated condition of a pickup key associated with a first telephone line at said station, and by the operated condition of said overflow key at said station, and by an incoming connection over a second one of said telephone lines for transmitting over said "A" lead of said incoming second line and marking signal potential, and means controlled by said marking signal potential on said "A" lead of said second line for establishing a communication connection from said second line to said communication circuit.

17. The invention set forth in claim 16 wherein said last-mentioned means includes a first multiposition selector, each position of said selector uniquely associated with one of said telephone lines.

18. The invention set forth in claim 12 wherein said station further comprises a night service key and wherein said transfer circuit further comprises a communication circuit, means controlled jointly by the operated condition of said night service key and by an incoming connection over any one of said telephone lines for transmitting over said "A" lead of a telephone line associated with said incoming connection said marking signal potential, and means controlled by said marking signal potential on said "A" lead of said incoming line for establishing a communication connection from said incoming line to said communication circuit.

19. The invention set forth in claim 18 wherein said last-mentioned means includes a first miltiposition selector, each position of said selector uniquely associated with one of said telephone lines.

20. A transfer circuit for use in a key telephone system wherein communication connections may be established from any one of a number of telephone lines to at least one key station under control of pickup keys at said station, each said pickup key being associated with a unique one of said telephone lines and operable for supplying marking signal potentials over an "A" lead for controlling communication connections over said associated line, said station including an overflow key, said transfer circuit comprising a communication circuit, means controlled jointly by the operated condition of a pickup key associated with a first telephone line at said station, and by the operated condition of said overflow key at said station, and by an incoming connection over a second one of said telephone lines for transmitting over said "A" lead of said incoming second line, and marking signal potential, and means controlled by said marking signal potential on said "A" lead of said second line for establishing a communication connection from said second line to said communication circuit.

21. The invention as set forth in claim 20 wherein said last-mentioned means includes a first multiposition selector, each position of said selector uniquely associated with one of said telephone lines.

22. A transfer circuit for use in a key telephone system wherein commmunication connections may be established from any one of a number of telephone lines to at least one key station under control of a pickup keys at said station, each said pickup key being associated with a unique one of said telephone lines and operable for supplying marking signal potentials over an "A" lead for controlling communication connections over said associated line, said station including a night service key, said transfer circuit comprising a communication circuit, means controlled jointly by the operated condition of said night service key and by an incoming connection over any one of said telephone lines for transmitting over said "A" lead of a telephone line associated with said incoming connection said marking signal potential, and means controlled by said marking signal potential on said "A" lead of said incoming line for establishing a communication connection from said incoming line to said communication circuit.

23. The invention as set forth in claim 22 wherein said last-mentioned means includes a first multiposition selector, each position of said selector uniquely associated with one of said telephone lines.

* * * * *

UNITED STATES PATENT OFFICE
CERTIFICATE OF CORRECTION

Patent No. 3,800,098 Dated March 26, 1974

Inventor(s) John Grover Evans and Charles Ernest Morse

It is certified that error appears in the above-identified patent and that said Letters Patent are hereby corrected as shown below:

Column 1, line 8, change "increases" to --increase--.

Column 2, line 48, change "bfidge" to -- bridge -- .

Column 5, line 62, at the beginning of the line, delete "a".

Column 6, line 11, change "or" to --of--.

Column 7, line 24, change "9M-1" to --9M1-1--.

Column 9, line 40, change "9TB-5" to --9TR-5--.

Column 13, line 1, change "associates" to --associated--.

Column 14, line 37, after "one" and before "a", insert --of--;

line 62, after "line" and before "marking" insert --said--;

line 65, after " 'A' " and before "for", insert --lead--.

Column 15, line 24, change "and" to --said--.

Column 16, line 30, before "pickup", delete "a".

Signed and sealed this 5th day of November 1974.

(SEAL)
Attest:

McCOY M. GIBSON JR.
Attesting Officer

C. MARSHALL DANN
Commissioner of Patents

FORM PO-1050 (10-69) USCOMM-DC 60376-P69